US012630063B2

(12) United States Patent　　(10) Patent No.:　US 12,630,063 B2
Piederriere et al.　　　　　　　　(45) Date of Patent:　May 19, 2026

(54) COVER SYSTEM FOR WRAPPING A BACKREST FRAME

(71) Applicant: FAURECIA Sièges d'Automobile, Nanterre (FR)

(72) Inventors: Jean-Yves Piederriere, Angerville (FR); Jérôme Planson, Angerville (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 218 days.

(21) Appl. No.: 18/645,615

(22) Filed: Apr. 25, 2024

(65) Prior Publication Data

US 2024/0359607 A1　　Oct. 31, 2024

(30) Foreign Application Priority Data

Apr. 26, 2023　(FR) ....................................... 2304222

(51) Int. Cl.
　　*B60N 2/58*　　　　(2006.01)
　　*B60N 2/68*　　　　(2006.01)
(52) U.S. Cl.
　　CPC ................. *B60N 2/58* (2013.01); *B60N 2/68* (2013.01)
(58) Field of Classification Search
　　CPC . B60N 2/58; B60N 2/68; B60N 2/686; B60N 2/803; B60N 2/6009; B60N 2/5891
　　See application file for complete search history.

(56) References Cited

U.S. PATENT DOCUMENTS

| | | | |
|---|---|---|---|
| 2014/0042785 A1* | 2/2014 | Sato ....................... | B60N 2/686 |
| | | | 297/216.14 |
| 2018/0001809 A1* | 1/2018 | Kaneda ................... | B60N 2/686 |
| 2019/0176665 A1* | 6/2019 | Inoue ..................... | B60N 2/682 |
| 2022/0212581 A1* | 7/2022 | Gasko .................... | B60N 2/686 |

OTHER PUBLICATIONS

French Preliminary Search Report for priority French Patent App. No. FR2304222 dated Nov. 15, 2023, 8 pages, No English Translation available.

* cited by examiner

*Primary Examiner* — Valentina Xavier
(74) *Attorney, Agent, or Firm* — Barnes & Thornburg LLP

(57) ABSTRACT

The present disclosure relates to a cover system configured to wrap a backrest frame, and comprising a cover comprising:
　a first and a second closed tubular sections, arranged on a lower part of the cover, configured to be separated from each other in the transverse direction,
　an intermediate section of cover, arranged on an upper part of the cover connecting the closed tubular sections, comprising an internal space configured to house an upper transverse part of the frame, communicating, on either side of the lateral recess, respectively with a first internal space and with a second internal space configured respectively to house lateral posts,
　a central panel laterally attached to the closed tubular sections and to the intermediate section of the cover.

12 Claims, 6 Drawing Sheets

COVER SYSTEM FOR WRAPPING A BACKREST FRAME

PRIORITY CLAIM

This application claims priority to French Patent Application No. FR2304222, filed Apr. 26, 2023, which is expressly incorporated by reference herein.

BACKGROUND

The present disclosure relates to the field of cover systems to wrap a seat backrest frame, in particular for a motor vehicle seat, and more particularly for a motor vehicle front seat.

The present disclosure relates to an assembly comprising a seat backrest and a cover system according to the present disclosure. The present disclosure further relates to a method for mounting an assembly comprising a cover system according to the present disclosure.

SUMMARY

According to the present disclosure, a cover system is configured to wrap a backrest frame, the frame comprising two lateral posts connected together in upper parts by an upper transverse part, the lateral posts leaving a free clearance, an interlayer defined between the two lateral posts in a transverse direction and between the upper transverse part of the frame and a lower edge of the backrest along a direction comprising a vertical component, the cover system comprising a cover, comprising:

a first closed tubular section, and a second closed tubular section, arranged on a lower part of the cover, the two closed tubular sections respectively configured to wrap the two lateral posts, the first closed tubular section and the second closed tubular section configured to be separated from each other in the transverse direction between the two posts, an intermediate cover section, arranged on an upper part of the cover configured to wrap the upper transverse part of the frame, the intermediate cover section connecting the first closed tubular section and the second closed tubular section, wherein the intermediate cover section comprises an intermediate internal space configured to house the upper transverse part of the frame, the intermediate internal space communicating, on either side of the lateral recess, respectively with a first internal space of the first closed tubular section and with a second internal space of the second closed tubular section, respectively configured to house the lateral posts, and wherein the cover system comprises a central panel fixed laterally to closed tubular sections and to the intermediate section of the cover.

The features disclosed in the following paragraphs may optionally be implemented. They may be implemented independently of each other or in combination with each other:

the cover comprises an opening that runs around the central panel continuously along the first closed tubular section, the intermediate section, and the second closed tubular section, equipped with a reversible closure means configured to pass the cover into an open position allowing the insertion of the frame into the cover through the opening or on the contrary its extraction to a closed position, for which the frame is wrapped in the cover;

the central panel is attached to the cover by a seam that preferably runs continuously along a border of the central panel by providing the securing of the central panel to the first closed tubular section, to the intermediate section and to the second closed tubular section;

at least the first closed tubular section and/or the second closed tubular section and/or the intermediate section comprises a first flexible part and a second flexible part connected together by the seam to the central panel at first longitudinal edges of the first flexible part and of the second flexible part, and delimiting the opening between two second longitudinal edges of the first flexible part and of the second flexible part, the reversible closing means providing the reversible closing by joining the second longitudinal edges;

the reversible closure means comprises a first part and a second part mutually engaging removably, in particular a first part and a second part of a zipper, each part extending on either side of the opening, the first part extending on an edge of the cover rigidly connected to the closed tubular sections and the intermediate section, and the second part extending on an edge rigidly connected to the central panel.

The present disclosure also relates to an assembly comprising a seat backrest and a cover system as defined above, the backrest comprising a frame comprising two lateral posts connected together in upper parts by an upper transverse part, leaving free clearance, interlayer defined between the two lateral posts in a transverse direction and between the upper transverse part and a lower edge of the backrest in a direction comprising a vertical component, the backrest comprising a front face able to receive the back of an occupant of the seat and a rear face opposite the front face, the cover system comprising the cover comprising:

the first closed tubular section, and the second closed tubular section, arranged on a lower part of the cover, the two closed tubular sections wrapping respectively the two lateral posts, the first closed tubular section and the second closed tubular section separated from each other in the transverse direction between the two posts, the intermediate cover section, arranged on an upper part of the cover wrapping the upper transverse part of the frame, the intermediate cover section connecting the first closed tubular section and the second closed tubular section, wherein the intermediate cover section comprises an intermediate internal space housing the upper transverse part of the frame, the intermediate internal space communicating, on either side of the lateral recess, respectively with the first internal space of the first closed tubular section and with the second internal space of the second closed tubular section, housing respectively the lateral posts, and wherein the cover system comprises a central panel fixed laterally to closed tubular sections and to the intermediate section of the cover, the central panel being lodged between the lateral posts on the rear face of the backrest.

The features disclosed in the following paragraphs may optionally be implemented. They may be implemented independently of each other or in combination with each other:

the cover comprises the opening that runs around the central panel continuously along the first closed tubular section, the intermediate section, and the second closed tubular section, equipped with a reversible closure means configured to pass the cover into an open position allowing the insertion of the frame into the cover through the opening or on the contrary its extraction to a closed position, for which the frame is wrapped in the cover;

the central panel extends in the free clearance between the two lateral posts so as to provide an open cavity at the rear of the backrest, delimited between the closed tubular sections along the transverse direction and between the intermediate section and a lower edge of the central panel;

the backrest comprises a shell able to support the back of an occupant of the seat extending in the transverse direction from a first lateral edge to a second lateral edge beyond the two lateral posts and extending in the direction comprising a vertical component, the shell connected to the frame by mechanical connections and wherein at least the first closed tubular section and the second closed tubular section of the cover have, on a front face, orifices configured to be passed through by the mechanical connections between the shell and the frame;

the frame has a framework comprising a first tube and a second tube arranged at a distance from the first tube in a longitudinal direction and attached thereto by means of plates, the first tube and the second tube each comprising two lateral parts forming together laterally the two lateral posts, the two lateral parts of the first tube being interconnected in the upper part by an upper cross-member, the two lateral parts of the second tube being interconnected in a lower part by a lower cross-member, and the two lateral parts of the second tube being connected to each other in a second upper part by an upper transverse part arranged at a distance from the upper cross-member along the direction comprising a vertical component to form a headrest frame, and wherein the cover comprises a headrest padding in the intermediate space of the intermediate section of the cover hosting the upper transversal part of the frame to form a headrest and wherein the backrest comprises the shell to support the back of a seat's occupant extending along the transversal direction of a first lateral edge to a second lateral edge, beyond which the two lateral posts extend along the direction comprising a vertical component of the upper edge beyond the upper cross-member to a lower edge beyond the lower cross-member and the lower transversal part, the shell comprising a front face covered by padding, and a back face opposite to the front face, the back face of the shell being linked to the first tube so that the first tube is interposed between the shell and the second tube along the longitudinal direction;

the cover system comprises a first lower fastening profile, configured to hook a lower transverse part, in particular a lower cross-member of the frame and a second upper fastening profile, configured to hook an upper transverse part, in particular an upper cross-member of the frame, by providing a tensioning of the cover along the direction comprising a vertical component.

The present disclosure also relates to a method for mounting an assembly comprising a cover system as defined above and a seat backrest, wherein the seat backrest comprises an armature comprising two lateral posts connected together in upper parts by an upper transverse part, leaving free clearance, interlayer delimited between the two lateral posts in a transverse direction and between the upper transverse part and a lower edge of the backrest in a direction comprising a vertical component, the method comprising the following steps, the reversible closing means being in the open position;

inserting the armature into the cover through the opening with placing the intermediate cover section around the upper transverse part of the frame in order to house the upper transverse part of the frame in the interspace so as to wrap the upper transverse part, and a placing each of the two lateral posts respectively in the first internal space of the first closed tubular section and in the second internal space of the second closed tubular section so as to wrap the two lateral posts, a passage of the cover from the opening position to the closing position for which the frame is wrapped in the cover by closing the reversible closing means equipping the opening which runs around the central panel along the first closed tubular section, the intermediate section, and the second closed tubular section.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 shows a motor vehicle seat backrest comprising a frame and a shell configured to support the occupant's back.

FIG. 2 schematically shows an assembly comprising a backrest with a frame such as in FIG. 1 and a cover system, seen from the rear, wherein the cover system wraps the lateral posts and the upper part of the frame of the backrest visible in FIG. 1, the cover being in a closed position for which the frame is wrapped in the cover. The frame is shown in dashed lines.

DETAILED DESCRIPTION

The following drawings and description contain, for the most part, elements of certainty. They may therefore not only serve to enhance understanding of this disclosure, but also contribute to its definition, where appropriate.

In the following description, the terms "front", "rear", "upper", "lower" are understood relative to a conventional installation of a seat in a vehicle.

Figure 1:
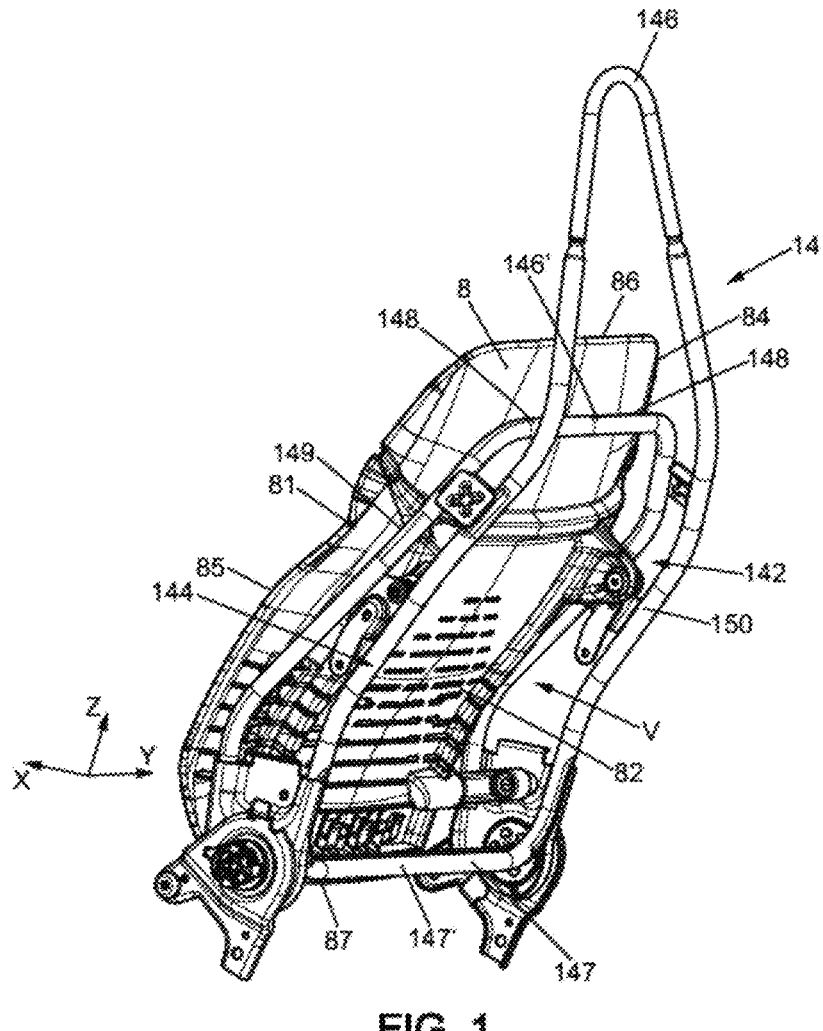

The present disclosure relates to a cover system 25 configured to wrap a backrest 12 frame 14 visible in FIG. 1, the frame 14 comprising two lateral posts 142, 144 connected together in upper portions 146 by an upper transverse portion 146'. The lateral posts 142, 144 leave a free clearance V, the interlayer defined between the two lateral posts 142, 144 in a transverse direction Y and between the upper transverse part 146' of the frame 14 and a lower edge 126 of the backrest along a direction Z comprising a vertical component.

The lateral posts 142, 144 are in particular connected to each other in lower parts 147 by a lower transverse part 147'.

The cover system 25 shown in FIGS. 2 to 6 comprises a cover 250 comprising a first closed tubular section 251, and a second closed tubular section 252, arranged on a lower part 260 of the cover 250.

Figure 2:
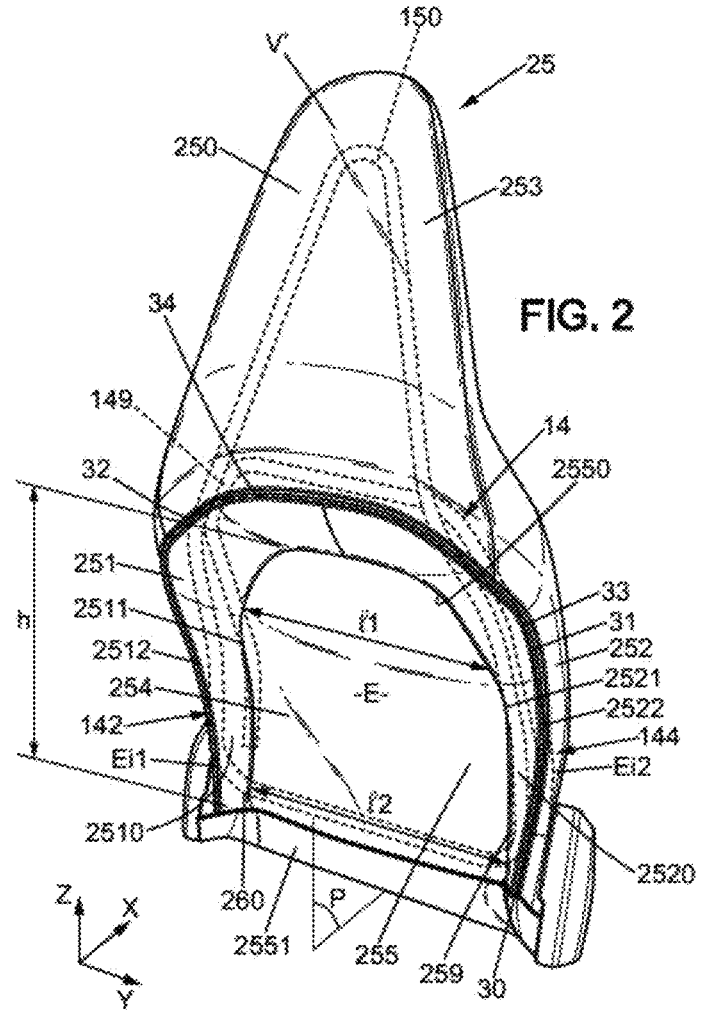
Figure 4:
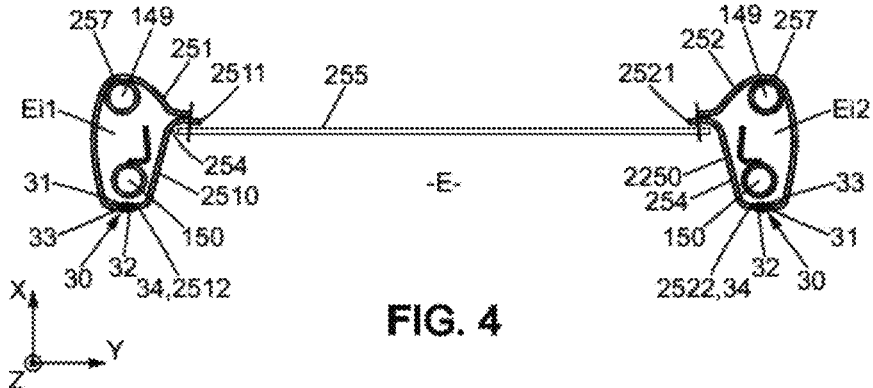
FIG. 4 shows a cross-sectional view along a plane XY of the assembly of FIG. 2, at the lateral posts of the frame.

The two closed tubular sections 251, 252 are respectively configured to wrap the two lateral posts 142, 144. To this end, as can be seen in FIGS. 2 and 4, the first closed tubular section 251 comprises a first internal space Ei1 configured to house one of the lateral posts 142. The second closed tubular section 252 comprises a second internal space Ei2 configured to house the other lateral post 144.

The first closed tubular section 251 and the second closed tubular section 252 are configured to be separated from each other in the transverse direction Y between the two posts 142, 144.

The cover 250 further comprises an intermediate section 253 of cover, arranged on an upper part of the cover 250 configured to wrap the upper transverse part 146' of the frame 14. The intermediate section 253 of cover connects the first closed tubular section 251 and the second closed tubular section 252.

The intermediate cover section 253 comprises an intermediate internal space V' configured to house the upper transverse part 146' of the frame 14, the intermediate internal space V' communicating, on either side of the lateral recess V, respectively with the first internal space Ei1 of the first closed tubular section 251 and with the second internal space Ei2 of the second closed tubular section 252 configured respectively to house the lateral posts 142, 144.

The intermediate section 253 is in particular provided to form with the upper transverse part 146' of the frame 14 a headrest 18 as will be detailed below.

Thus, the cover 250 has a U-shaped enveloping surface configured to cover only the two lateral posts 142, 144 and the upper transverse part 146' of the frame 14.

The cover 250 is in no way configured to cover a backrest padding.

The cover system 25 comprises a central panel 255 attached laterally to the closed tubular sections 251, 252 and to the intermediate section 253 of the cover 250.

The cover system 25 according to the present disclosure makes it possible to limit the use of material to produce the cover 250 as opposed to an integral cover in the form of a single tubular section. Indeed, when the cover 250 is installed on a backrest 12, the central panel 255 is sufficient to fill the gap between the two closed tubular sections 251, 252, and further releases a space for example for the knees of a rear passenger as will be explained below. There is no lost surface to cover the backrest 12.

Figure 5:
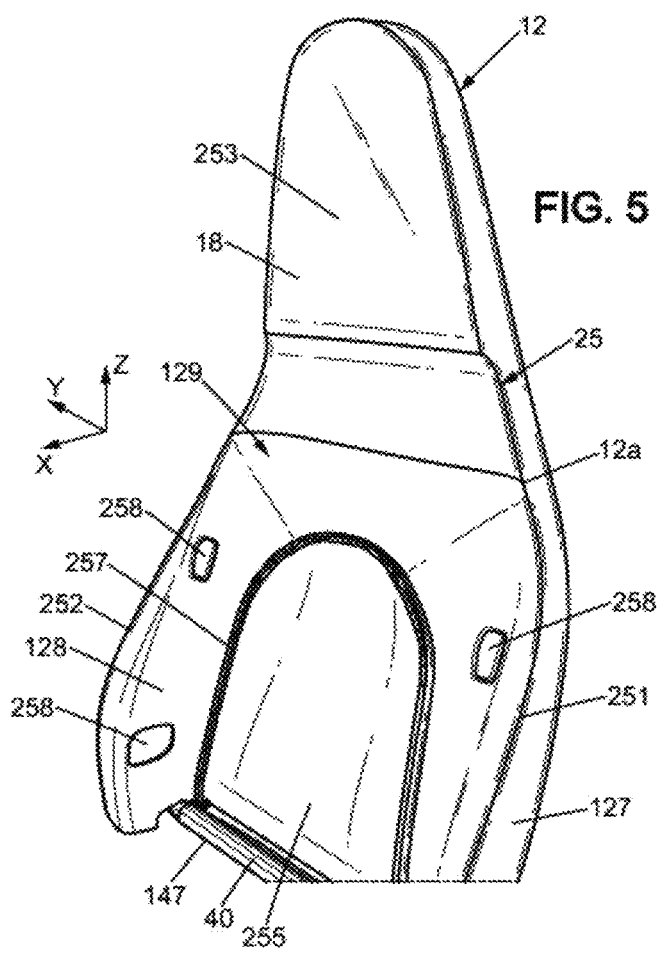
FIG. 5 shows the assembly of FIG. 2, seen from the front, wherein the cover system wraps the lateral posts and the upper part of the frame of the backrest visible in FIG. 1.
Figure 6:
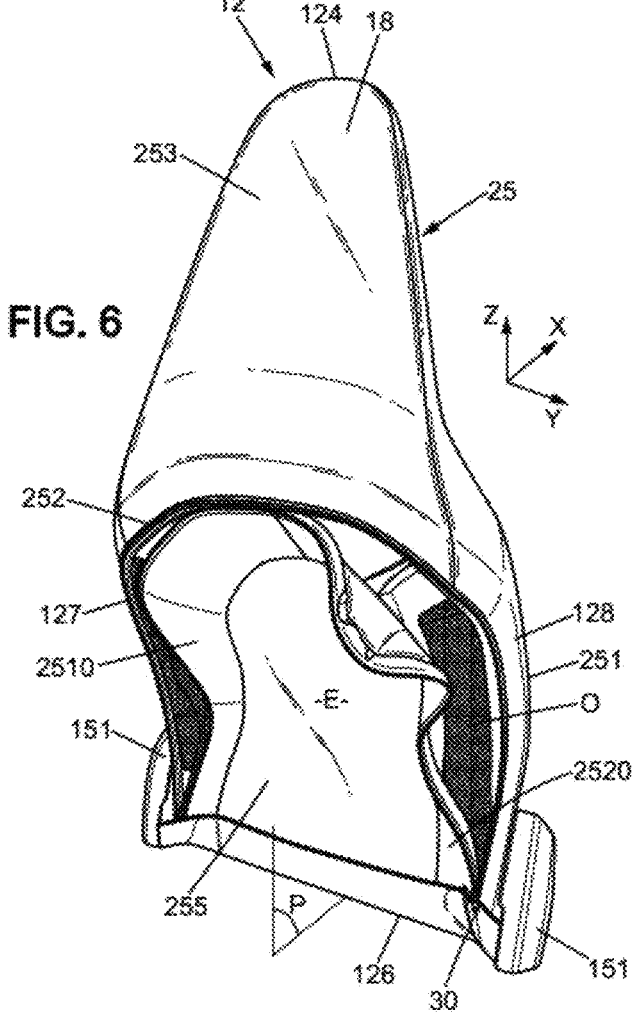
FIG. 6 shows the assembly of FIG. 2 seen from the rear, wherein the cover system wraps the lateral posts and the upper part of the frame of the backrest visible in FIG. 1, the cover being in an open position allowing the insertion of the frame into the cover through the opening or on the contrary its extraction.

In particular, the cover 250 comprises an opening O that runs around the central panel 255 continuously along the first closed tubular section 251, the intermediate section 253, and the second closed tubular section 252. The opening O is equipped with a reversible closure means 30 configured to pass the cover 250 into an open position (FIG. 6) allowing the insertion of the frame 14 into the cover 250 through the opening or on the contrary its extraction to a closed position for which the frame 14 is wrapped in the cover 250 (FIGS. 2, 4 and 5).

The reversible closure means 30 facilitates the insertion of the frame 14 into the cover 250, and allows at any moment to access the frame 14 of the backrest 12 when necessary without removing the cover 250 completely from the backrest 12, as in the context of a maintenance for example.

The cover 250 can be made of fabric, or of any other technically feasible material.

The cover 250 has a rear face 254 intended to be visible when the cover system 25 wraps the frame 14 of a backrest 12 and a front face 257 opposite the rear face 254, the lower part of which comprising the closed tubular sections 251, 252 is intended to be masked. According to one embodiment, the closed tubular sections 251, 252 have orifices 258 on the front face 257. For example, each closed tubular section 251, 252 comprises on the front face 257 an orifice 258 near a junction between the closed tubular section 251, 252 and the intermediate section 253, and an orifice 258 near a lower edge of the cover 250. The orifices 258 are advantageously configured to be crossed by mechanical connections between a shell 8 for supporting the back of an occupant and the frame 14 of the backrest 12, as will be detailed below.

According to an advantageous feature, the central panel 255 is attached to the cover 250 by a seam 259 which preferably runs continuously along a border 2550 of the central panel 255 by providing the securing of the central panel 255 to the first closed tubular section 251, to the intermediate section 253 and to the second closed tubular section 252. Thus, when the cover 250 is in the closed position, the central panel 255 is set back relative to the opening O which runs around the central panel 255.

According to another advantageous feature, at least the first closed tubular section 251 and/or the second closed tubular section 252 and/or the intermediate section 253 comprise a first flexible part 2510 and a second flexible part 2520 connected together by the seam to the central panel 255 at first longitudinal edges 2511, 2521 of the first flexible part 2510 and the second flexible part 2520, and delimiting the opening O between two second longitudinal edges 2512, 2522 of the first flexible part 2510 and the second flexible part 2520, the reversible closure means 30 providing the reversible closing by junction of the second longitudinal edges 2512, 2522. In particular, the first closed tubular section 251 and the intermediate section 253 comprise the first flexible part 2510, the second closed tubular section 252 and the intermediate section 253 comprise the second flexible part 2520. The first flexible part 2510 and the second flexible part 2520 can be symmetrical relative to a plane P (YZ) of symmetry of the cover 250.

According to one embodiment, the reversible closure means 30 comprises a first part 31 and a second part 32 mutually engaging removably, in particular a first part 31 and a second part 32 of a slide. Each part 31, 32 extends on either side of the opening O, the first part 31 extending over an edge 33 of the cover 250 rigidly connected to the closed tubular sections 251, 252 and of the intermediate section 253, and the second part 32 extending on an edge 34 rigidly connected to the central panel 255. In particular, the second part 32 of the reversible closure means 30 extends along the second longitudinal edges 2512, 2522 of the first flexible part 2510 and the second flexible part 2520.

According to variants, the reversible closure means comprises pressure buttons, hooks, self-gripping strips or any other reversible closure means that can be technically envisaged.

The present disclosure also relates to an assembly comprising a seat backrest 12 and a cover system 25 as previously described.

The seat backrest 12 is in particular for a vehicle front seat, in particular a motor vehicle seat.

Returning to FIG. 1, the backrest 12 extends in height, generally along the direction Z, or a direction slightly inclined (by a slight rotation around Y) relative to the direction Z, from a lower edge 126 to an upper edge 124 of the backrest 12, in width, transversely, along the direction Y, along a first lateral edge 127 to a second lateral edge 128 of the backrest 12, and in thickness, along the direction X, or a direction slightly inclined (by a rotation around Y) relative to the direction X.

The backrest 12 comprises a front face 120 able to receive the seat occupant's back and a rear face 121 opposite the front face 120. When the seat comprising the backrest 12 is mounted in the vehicle, the front face 120 of the backrest is directed toward the dashboard of the vehicle and the rear face 121 is directed toward a rear seat of the vehicle.

As explained above, the frame 14 of the backrest 12 comprises two lateral posts 142, 144 connected together in upper parts 146 by an upper transverse part 146'. The lateral posts 142, 144 leave a free clearance V, the interlayer defined between the two lateral posts 142, 144 in a transverse direction Y and between the upper transverse part 146' and a lower edge 126 of the backrest along a direction Z comprising a vertical component.

Advantageously, the frame 14 has a frame comprising a first tube 149 and a second tube 150 arranged at a distance from the first tube 149 in a longitudinal direction X and attached thereto by means of plates.

The first tube 149 and the second tube 150 may each comprise two lateral parts forming together laterally the two lateral posts 142, 144, the two lateral parts of the first tube 149 being interconnected in the upper part 146 by an upper cross-member 148, the two lateral parts of the second tube 150 being interconnected in a lower part 147 by a lower cross-member 147, and the two lateral parts of the second tube 150 being connected together in a second upper part 146 by an upper transverse part 146' arranged at a distance from the upper cross-member 148 in the direction Z comprising a vertical component to form a headrest frame 18.

The first tube 149 and the second tube 150 can be shaped by folding or bending. According to the example shown, the first tube 149 has no lower transverse part connecting the two lateral parts of the first tube 149. As a variant, the first tube 149 may comprise a lower transverse part, and the second tube 150 may have no, or both tubes may each comprise a lower transverse part.

The first closed tubular section 251 of the cover 250, and the second closed tubular section 252 respectively wrap the two lateral posts 142, 144. The first closed tubular section 251 and the second closed tubular section 252 are separated from each other in the transverse direction Y between the two posts 142, 144.

The intermediate section 253 of cover, arranged on an upper part of the cover 250 wraps the upper transverse part 146' of the frame 14.

The intermediate internal space V' of the section 256 houses the upper transverse part 146' of the frame 14, the intermediate internal space V' communicating, on either side of the lateral recess V, respectively with the first internal space Ei1 of the first closed tubular section 251 and with the second internal space Ei2 of the second closed tubular section 252 respectively housing the lateral posts 142, 144.

The central panel 255 of the cover 250 is housed between the lateral posts 142, 144 on the rear face 121 of the backrest 12 and the opening O runs around the central panel 255 continuously along the first closed tubular section 251, of the intermediate section 253, and of the second closed tubular section 252, equipped with a reversible closure means 30 configured to pass the cover 250 into an open position allowing the insertion of the frame 14 into the cover 250 through the opening or on the contrary its extraction to a closed position for which the frame 14 is wrapped in the cover 250.

As can be seen in FIG. 2, the central panel 255 has a height h taken from a lower edge of the central panel 255 to an upper edge of the central panel 255, substantially along the direction Z comprising a vertical component, the height h being able to be between 200 mm and 500 mm, preferentially between 300 mm and 450 mm, in particular between 360 mm and 420 mm.

The central panel 255 also has a width l taken along the transverse direction Y. The width of the central panel 255 can be regular or vary as a function of the height of the central panel 255. In the embodiment shown, the width is different, in particular greater, in a lower part of the central panel 255 than in an upper part of the central panel 255.

For example, a first width l1 taken at three quarters of the height of the central panel 255 from a lower edge of the central panel 255 is between 150 mm and 320 mm, preferably between 220 mm and 260 mm. For example, a second width l2 taken along the lower edge of the central panel 255 is between 150 mm and 340 mm, preferably between 275 mm and 305 mm.

According to an advantageous feature, the central panel 255 extends in the free clearance V between the two lateral posts 142, 144 so as to provide an open cavity E at the rear of the backrest 12, delimited between the closed tubular sections 251, 252 in the transverse direction Y and between the intermediate section 253 and a lower edge 2551 of the central panel 255.

In this case, it is not necessary to further fill the free clearance V between the lateral posts 142, 144. In addition, the open cavity E thus provided at the rear of the backrest 12 provides better comfort for a passenger located behind a seat comprising such a backrest 12, offering them the possibility of placing their knees therein, by providing a "knee space". In the absence of a rear passenger, the open cavity E also makes it possible to have an additional volume for luggage or objects to be transported.

Figure 3:
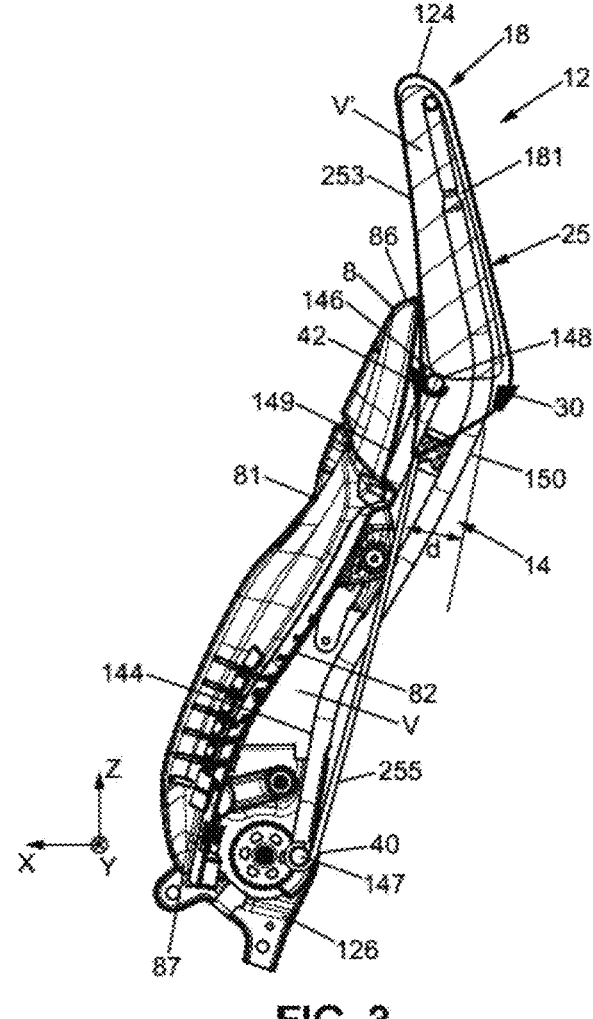
FIG. 3 shows a sectional view along a plane XZ of the assembly of FIG. 2 where the backrest comprises a shell.

In particular, as shown in FIG. 3, the central panel 255 extends in the free clearance V at a maximum depth d taken in the longitudinal direction X from a first point of the central panel 255 located at a height of two thirds of a part of the backrest 12 extending from the lower edge 126 of the backrest to an upper edge of the backrest 12 or of the lower edge 126 of the backrest to a lower edge of the headrest 18 if the seat comprises a headrest 18, to a second point located on a projection parallel to the central panel 255 of a third point of the frame 14 located furthest back of the backrest 12 in the longitudinal direction X.

The maximum depth d of the central panel 255 is for example between 20 mm and 90 mm, preferentially between 30 mm and 70 mm, in particular between 40 mm and 60 mm, and more particularly still between 45 mm and 55 mm.

In particular, when the frame 14 has a first tube 149 and a second tube 150, the projection is carried out by taking the second tube 150 as reference.

Such depth values d make it possible to release a knee space, sufficiently deep to free up space at the rear of the seat.

It should be noted that the depth values d of the central panel 255 are preferably independent of the values of width l and height thereof.

The cover 250 may comprise a head-bearing padding 181 in the interspace V' of the intermediate section 253 of cover housing the upper transverse part 146' of the frame 14 to form a headrest 18, as can be seen in FIG. 3. This confers comfort on the occupant of a seat comprising such a backrest 12.

According to a particular embodiment visible in FIGS. 1 and 3, the backrest 12 comprises a shell 8 able to support the back of an occupant of the seat extending along the transverse direction Y from a first lateral edge 84 to a second lateral edge 85 beyond the two lateral posts 142, 144 and extending along the direction Z comprising a vertical component.

The shell 8 extends in particular along the direction Z comprising a vertical component of an upper edge 86 beyond the upper cross-member 148 to a lower edge 87 beyond the lower cross-member 147 and the lower transverse part 147'. The shell 8 comprises a front face 81 covered with a padding (not shown), and a rear face 82 opposite the front face 81. In particular, the rear face of the shell 8 is connected to the first tube 149 so that the first tube 149 is inserted between the shell 8 and the second tube 150 in the longitudinal direction X. The cover 250 does not cover the padding of the shell 8. There is no padding between the rear face 82 of the shell 8 and the lateral posts 142, 144. An occupant of the seat will therefore be seated against the shell 8 of the backrest 12 with the padding providing for the comfort of the occupant. The fact of omitting a padding between the rear face 82 of the shell 8 and the lateral posts 142, 144 simply extending the central panel 255 of the cover 250 in the free clearance V therefore does not negatively impact the comfort of an occupant of a seat comprising the backrest 12.

The shell 8 is for example a shaped part made of a plastic material. This is a light part, the production of which is inexpensive.

The shell 8 is connected to the frame 14 by mechanical connections. The shell 8 can be connected to the frame by screw-fitting, by force-fitting, or by any technically conceivable mechanical connection means.

Advantageously, at least the first closed tubular section 251 and the second closed tubular section 252 of the cover 250 have, on a front face 257, orifices 258 configured to be passed through by the mechanical connections between the shell 8 and the frame 14. Thus, the shell 8 can be attached to the frame 14 after having mounted the cover system 25 on the backrest 12. It can also be removed if necessary without removing the cover 250.

According to an advantageous embodiment shown in FIG. 3, the cover system 25 comprises a lower first fastening profile 40, configured to hook the lower transverse part 147 in particular the lower cross-member 147 of the frame 14 and a upper second fastening profile 42, configured to hook the upper transverse part 146', in particular the upper cross-member 148 of the frame 14, providing a tensioning of the cover along the direction Z comprising a vertical component.

The first fastening profile 40 extends for example along the lower edge 2551 of the central panel 255. The second fastening profile 42 extends for example along the intermediate section 253 in the interspace V', in particular on the side of the front face 257 of the cover 250. The second fastening profile 42 advantageously contributes to tensioning the central panel 255 to provide the open cavity E at the rear of the backrest 12.

The present disclosure also relates to a method for mounting an assembly comprising a cover system 25 and a seat back 12, in particular an assembly according to the present disclosure, wherein the seat backrest 12 comprises a frame 14 comprising two lateral posts 142, 144 connected together in upper parts 146 by an upper transverse part 146' and in the lower parts 147 by a lower transverse part 147', leaving a free clearance V, interposed between the two lateral posts 142, 144 along a transverse direction Y and between the upper transverse part 146' and the lower transverse part 147' in a direction Z comprising a vertical component.

The method comprises the following steps, the reversible closure means 30 being in the open position:

inserting the frame into the cover through the opening with placing the intermediate section 253 of cover around the upper transverse part 146' of the frame 14 to house the upper transverse part 146' of the frame 14 in the interspace V' so as to wrap the upper transverse part 146', and a placing each of the two lateral posts 142, 144 respectively in the first internal space Ei1 of the first closed tubular section 251 and in the second internal space Ei2 of the second closed tubular section 252 so as to wrap the two lateral posts 142, 144, a passage of the cover 250 from the open position to the closed position for which the frame 14 is wrapped in the cover 250 by closing the reversible closure means 30 equipping the opening O running around the central panel 255 along the first closed tubular section 251, of the intermediate section 253, and of the second closed tubular section 252.

The cover system 25 can therefore be mounted simply on a backrest frame 14 and it is sufficient to close the reversible closure means 30 when the cover 250 wraps the first closed tubular section 251, the second closed tubular section 252 and the intermediate section 253.

According to one embodiment wherein the cover system 25 comprises a first fastening profile 40 and a second fastening profile 42, during the mounting method, the lower first fastening profile 40 is attached to the lower transverse part 147, in particular the lower cross-member 147 of the frame 14 and the upper second fastening profile 42, is attached the upper transverse part 146', in particular the upper cross-member 148 of the frame 14. A tensioning of the cover along the direction Z comprising a vertical component is thus provided.

According to one embodiment wherein the backrest 12 comprises a shell 8, the shell 8 can be assembled to the frame 14 by mechanical connections between the shell 8 and the frame 14 through the orifices 258 provided for this purpose on the front face 257 of at least the first closed tubular section 251 and the second closed tubular section 252 of the cover 250. The front face 81 of the shell 8 is advantageously covered with padding.

A comparative vehicle seat comprises a squab, comprising a squab frame and a squab lining, configured to receive the lower part of an occupant's body, and a backrest comprising a backrest frame and a backrest lining configured to receive the upper part of the occupant body.

The comparative backrest frame comprises two lateral posts, connected together in upper parts by an upper transverse part. The lateral posts leave free clearance, interposed between the two lateral posts in a transverse direction and between the upper transverse part and a lower edge of the backrest along a direction Z comprising a vertical component.

The comparative backrest frame is covered with foam, and can be wrapped with a cover. For example, a comparative cover on a backrest frame may be pulled by turning it back on the back and by unwinding it from an upper edge of the backrest to a lower edge of the backrest.

Such a comparative cover then comprises a textile wrap that covers and surrounds the frame of the backrest over its height along posts of the frame and over its width along the cross-member.

Such a comparative cover is simple to pull on a backrest frame. However, such comparative covers have the following limitations:

difficult maintenance: as soon as control or intervention must be carried out on the frame, it is necessary to completely remove the cover of the backrest in order to be able to access the frame. Such an operation must be carried out with care in order not to damage the cover, in particular with elements protruding from the frame, a large quantity of material for its textile manufacturing, not configured to form a wrap that encases the entire frame of the backrest, a space at the rear, namely at the rear of the comparative backrest.

The present disclosure improves the situation.

A cover system is proposed that is configured to wrap a backrest frame, the frame comprising two lateral posts connected together in upper parts by an upper transverse part, the lateral posts leaving a free clearance, an interlayer defined between the two lateral posts in a transverse direction and between the upper transverse part of the frame and a lower edge of the backrest along a direction comprising a vertical component, the cover system comprising a cover, comprising:

a first closed tubular section, and a second closed tubular section, arranged on a lower part of the cover, the two closed tubular sections respectively configured to wrap the two lateral posts, the first closed tubular section and the second closed tubular section configured to be separated from each other in the transverse direction between the two posts, an intermediate cover section, arranged on an upper part of the cover configured to wrap the upper transverse part of the frame, the intermediate cover section connecting the first closed tubular section and the second closed tubular section, wherein the intermediate cover section comprises an intermediate internal space configured to house the upper transverse part of the frame, the intermediate internal space communicating, on either side of the lateral recess, respectively with a first internal space of the first closed tubular section and with a second internal space of the second closed tubular section, respectively configured to house the lateral posts, and wherein the cover system comprises a central panel fixed laterally to closed tubular sections and to the intermediate section of the cover.

The features disclosed in the following paragraphs may optionally be implemented. They may be implemented independently of each other or in combination with each other:

the cover comprises an opening that runs around the central panel continuously along the first closed tubular section, the intermediate section, and the second closed tubular section, equipped with a reversible closure means configured to pass the cover into an open position allowing the insertion of the frame into the cover through the opening or on the contrary its extraction to a closed position, for which the frame is wrapped in the cover;

the central panel is attached to the cover by a seam that preferably runs continuously along a border of the central panel by providing the securing of the central panel to the first closed tubular section, to the intermediate section and to the second closed tubular section;

at least the first closed tubular section and/or the second closed tubular section and/or the intermediate section comprises a first flexible part and a second flexible part connected together by the seam to the central panel at first longitudinal edges of the first flexible part and of the second flexible part, and delimiting the opening between two second longitudinal edges of the first flexible part and of the second flexible part, the reversible closing means providing the reversible closing by joining the second longitudinal edges;

the reversible closure means comprises a first part and a second part mutually engaging removably, in particular a first part and a second part of a zipper, each part extending on either side of the opening, the first part extending on an edge of the cover rigidly connected to the closed tubular sections and the intermediate section, and the second part extending on an edge rigidly connected to the central panel.

The present disclosure also relates to an assembly comprising a seat backrest and a cover system as defined above, the backrest comprising a frame comprising two lateral posts connected together in upper parts by an upper transverse part, leaving free clearance, interlayer defined between the two lateral posts in a transverse direction and between the upper transverse part and a lower edge of the backrest in a direction comprising a vertical component, the backrest comprising a front face able to receive the back of an occupant of the seat and a rear face opposite the front face, the cover system comprising the cover comprising:

the first closed tubular section, and the second closed tubular section, arranged on a lower part of the cover, the two closed tubular sections wrapping respectively the two lateral posts, the first closed tubular section and the second closed tubular section separated from each other in the transverse direction between the two posts, the intermediate cover section, arranged on an upper part of the cover wrapping the upper transverse part of the frame, the intermediate cover section connecting the first closed tubular section and the second closed tubular section, wherein the intermediate cover section comprises an intermediate internal space housing the upper transverse part of the frame, the intermediate internal space communicating, on either side of the lateral recess, respectively with the first internal space of the first closed tubular section and with the second internal space of the second closed tubular section, housing respectively the lateral posts, and wherein the cover system comprises a central panel fixed laterally to closed tubular sections and to the intermediate section of the cover, the central panel being lodged between the lateral posts on the rear face of the backrest.

The features disclosed in the following paragraphs may optionally be implemented. They may be implemented independently of each other or in combination with each other:

the cover comprises the opening that runs around the central panel continuously along the first closed tubular section, the intermediate section, and the second closed tubular section, equipped with a reversible closure means configured to pass the cover into an open position allowing the insertion of the frame into the cover through the opening or on the contrary its extraction to a closed position, for which the frame is wrapped in the cover;

the central panel extends in the free clearance between the two lateral posts so as to provide an open cavity at the rear of the backrest, delimited between the closed tubular sections along the transverse direction and between the intermediate section and a lower edge of the central panel;

the backrest comprises a shell able to support the back of an occupant of the seat extending in the transverse direction from a first lateral edge to a second lateral edge beyond the two lateral posts and extending in the direction comprising a vertical component, the shell connected to the frame by mechanical connections and wherein at least the first closed tubular section and the second closed tubular section of the cover have, on a front face, orifices configured to be passed through by the mechanical connections between the shell and the frame;

the frame has a framework comprising a first tube and a second tube arranged at a distance from the first tube in a longitudinal direction and attached thereto by means of plates, the first tube and the second tube each comprising two lateral parts forming together laterally the two lateral posts, the two lateral parts of the first tube being interconnected in the upper part by an upper cross-member, the two lateral parts of the second tube being interconnected in a lower part by a lower cross-member, and the two lateral parts of the second tube being connected to each other in a second upper part by an upper transverse part arranged at a distance from the upper cross-member along the direction comprising a vertical component to form a headrest frame, and wherein the cover comprises a headrest padding in the intermediate space of the intermediate section of the cover hosting the upper transversal part of the frame to form a headrest and wherein the backrest comprises the shell to support the back of a seat's occupant extending along the transversal direction of a first lateral edge to a second lateral edge, beyond which the two lateral posts extend along the direction comprising a vertical component of the upper edge beyond the upper cross-member to a lower edge beyond the lower cross-member and the lower transversal part, the shell comprising a front face covered by padding, and a back face opposite to the front face, the back face of the shell being linked to the first tube so that the first tube is interposed between the shell and the second tube along the longitudinal direction;

the cover system comprises a first lower fastening profile, configured to hook a lower transverse part, in particular a lower cross-member of the frame and a second upper fastening profile, configured to hook an upper transverse part, in particular an upper cross-member of the frame, by providing a tensioning of the cover along the direction comprising a vertical component.

The present disclosure also relates to a method for mounting an assembly comprising a cover system as defined above and a seat backrest, wherein the seat backrest comprises an armature comprising two lateral posts connected together in upper parts by an upper transverse part, leaving free clearance, interlayer delimited between the two lateral posts in a transverse direction and between the upper transverse part and a lower edge of the backrest in a direction comprising a vertical component, the method comprising the following steps, the reversible closing means being in the open position;

inserting the armature into the cover through the opening with placing the intermediate cover section around the upper transverse part of the frame in order to house the upper transverse part of the frame in the interspace so as to wrap the upper transverse part, and a placing each of the two lateral posts respectively in the first internal space of the first closed tubular section and in the second internal space of the second closed tubular section so as to wrap the two lateral posts, a passage of the cover from the opening position to the closing position for which the frame is wrapped in the cover by closing the reversible closing means equipping the opening which runs around the central panel along the first closed tubular section, the intermediate section, and the second closed tubular section.

12: Backrest
120: Backrest front face
121: Backrest rear face
124: Upper edge of the backrest
126: Lower edge of the backrest
127: First side edge of the backrest
128: Second side edge of the backrest
14: Frame
142: First lateral post
144: Second lateral post
146: Upper parts of the frame
146': Upper transverse part of the frame
147: Lower parts of the frame, lower cross-member of the frame
147': Lower transverse parts of the frame
148: Upper cross-member of the frame
149: First tube
150: Second tube
18: Headrest
181: Headrest padding
25: Cover system
250: Cover
251: First closed tubular section
2510: First flexible part
2511: First longitudinal edge of the first flexible part
2512: Second longitudinal edge of the first flexible part
252: Second closed tubular section
2520: Second flexible part
2521: First longitudinal edge of the second flexible part
2522: Second longitudinal edge of the second flexible part
253: Intermediate section
254: Rear face of the cover
255: Central panel
2550: Central panel boundary
2551: Lower edge of the central panel
257: Front face of the cover
258: Opening
259: Stitching
260: Lower part of the cover
30: Reversible closing means
31: First part of the closing means
32: Second part of the closing means
33: Edge rigidly connected to the closed tubular sections and the intermediate section
34: Edge rigidly connected to the central panel
40: First fastening profile
42: Second fastening profile
8: Shell 81: Front face of the shell 82: Rear face of the shell 84: First lateral edge of the shell 85: Second lateral edge of the shell 86: Upper edge of the shell 87: Lower edge of the shell V: Free clearance V': Intermediate internal space Ei1: First internal space of the first closed tubular section Ei2: Second internal space of the second closed tubular section O: Opening E: Cavity open to back of folder

The invention claimed is:

1. A cover system configured to wrap a backrest frame, the frame having two side posts connected together in upper portions by an upper transverse portion, the side posts leaving free clearance, interlayer defined between the two side posts along a transverse direction and between the upper transverse portion of the frame and a lower edge of the backrest along a direction comprising a vertical component, the cover system comprising a cover comprising:

a first closed tubular section, and a second closed tubular section, arranged on a lower part of the cover, the two closed tubular sections respectively configured to wrap the two side posts, the first closed tubular section and the second closed tubular section configured to be spaced apart from each other in the transverse direction between the two posts, an intermediate section of cover, arranged on an upper part of the cover configured to wrap the upper transverse part of the frame, the intermediate section of cover connecting the first closed tubular section and the second closed tubular section wherein the intermediate section of cover comprises an intermediate internal space to lodge the upper transversal part of the frame, the intermediate internal space communicating, on both sides of the lateral clearance, respectively with a first internal space of the first closed tubular section and with a second internal space of the second closed tubular section configured respectively to lodge the lateral posts, and wherein the cover system comprises a central panel fixed laterally to the closed tubular sections and the intermediate section of the cover.

2. The cover system according to claim 1, wherein the cover comprises an opening that runs around the central panel continuously along the first closed tubular section, the intermediate section, and the second closed tubular section, equipped with a reversible closure means configured to pass the cover into an open position allowing insertion of the frame into the cover through the opening or conversely its extraction to a closed position for which the frame is wrapped in the cover.

3. The cover system according to claim 1, wherein the central panel is attached to the cover by a seam that preferably shortens continuously along a border of the central panel by providing the securing of the central panel to the first closed tubular section, the intermediate section and the second closed tubular section.

4. The cover system according to claim 2, wherein at least the first closed tubular section and/or the second closed tubular section and/or the intermediate section comprises a first flexible part and a second flexible part bonded together by the seam to the central panel at first longitudinal edges of the first flexible part and the second flexible part, and delimiting the opening between two second longitudinal edges of the first flexible part and the second flexible part, the reversible closing means providing the reversible closing by junction of the second longitudinal edges.

5. The cover system according to claim 2, wherein the reversible closure means comprises a first part and a second part mutually engaging removably, in particular a first part and a second part of a slide, each part extending on either side of the opening, the first part extending over an edge of the cover rigidly connected to the closed tubular sections and the intermediate section, and the second part extending over an edge rigidly connected to the central panel.

6. An assembly comprising a backrest of a seat and a cover system according to claim 1, the backrest comprising a frame comprising two lateral posts connected together in upper parts by an upper transverse part, leaving free clearance, interlayer defined between the two lateral posts in a transverse direction and between the upper transverse part and a lower edge of the backrest along a direction comprising a vertical component, the backrest comprising a front face able to receive the back of an occupant of the seat and a rear face opposite the front face, the cover system comprising the cover comprising:

the first closed tubular section, and the second closed tubular section, arranged on a lower part of the cover, the two closed tubular sections respectively wrapping the two lateral posts, the first closed tubular section and the second closed tubular section being separated from each other in the transverse direction between the two posts, the intermediate section of cover, arranged on an upper part of the cover wrapping the upper transverse part of the frame, the intermediate section of cover connecting the first closed tubular section and the second closed tubular section, wherein the intermediate section of the cover comprises the intermediate internal space housing the upper transversal part of the frame, the intermediate internal space communicating, on either side of the lateral recess, respectively with the first internal space of the first closed tubular section and with the second internal space of the second closed tubular section housing respectively the lateral posts, and wherein the cover system comprises a central panel fixed laterally to closed tubular sections and to the intermediate section of the cover, the central panel being lodged between the lateral posts on the rear face of the backrest.

7. The assembly according to claim 6, wherein the cover comprises an opening that runs around the central panel continuously along the first closed tubular section, the intermediate section, and the second closed tubular section, equipped with a reversible closure means configured to pass the cover into an open position allowing insertion of the frame into the cover through the opening or conversely its extraction to a closed position for which the frame is wrapped in the cover and wherein the cover comprises the opening which short around the central panel continuously along the first closed tubular section, the intermediate section, and the second closed tubular section, equipped with a reversible closure means configured to pass the cover into an open position allowing insertion of the frame into the cover through the opening or conversely its extraction to a closed position for which the frame is wrapped in the cover.

8. The assembly according to claim 6, wherein the central panel extends in the free clearance between the two lateral posts so as to provide an open cavity at the rear of the backrest, delimited between the closed tubular sections along the transverse direction and between the intermediate section and a lower edge of the central panel.

9. The assembly according to claim 6, wherein the back-rest comprises a shell able to support the back of an occupant of the seat extending along the transverse direction from a first lateral edge to a second lateral edge beyond the two lateral posts and extending in the direction comprising a vertical component, the shell connected to the frame by mechanical connections and wherein at least the first closed tubular section and the second closed tubular section of the cover have, on a front face, orifices configured to be passed through by the mechanical connections between the shell and the frame.

10. The assembly according to claim 9, wherein the frame has a frame comprising a first tube and a second tube arranged at a distance from the first tube in a longitudinal direction and attached thereto via plates, the first tube and the second tube each comprising two side parts forming laterally together the two side posts, the two lateral parts of the first tube being connected together in the top part by an upper cross-member, the two lateral parts of the second tube being connected to each other in a lower part by lower cross-member, and the two lateral parts of the second tube being connected to each other in a second upper part by a an upper traverse part arranged at a distance from the upper cross-member along the direction comprising a vertical component to form a headrest frame, and wherein the cover comprises a headrest padding in the intermediate space of the intermediate section of the cover housing the upper transversal part of the frame to form a headrest and wherein the backrest comprises the shell to support the back of the seat's occupant extending along the transversal direction of a first lateral edge to a second lateral edge, beyond which the two lateral posts extend along the direction comprising a vertical component of the upper edge beyond the upper cross-member to a lower edge beyond the lower cross-member and the lower transversal part, the shell comprising a front face covered by padding, and a back face opposite to the front face, the back face of the shell being linked to the first tube so that the first tube is interposed between the shell and the second tube along the longitudinal direction.

11. The assembly according to claim 6, wherein the cover system comprises a first lower fastening profile configured to hook a lower transverse part in particular a lower cross-member of the frame and a second upper fastening profile, configured to hook the upper transverse part in particular an upper cross-member of the frame by providing a tensioning of the cover along the direction comprising a vertical component.

12. A method for mounting an assembly comprising a cover system according to claim 2, and a seat backrest, wherein the seat backrest comprises a frame comprising two lateral posts connected together in upper parts by an upper transverse part, leaving free clearance, interlayer defined between the two lateral posts along a transverse direction and between the upper transverse part and a lower edge of the backrest along a direction comprising a vertical compo-nent, the method comprising the following steps, the reversible closing means being in the open position:
inserting the armature into the cover through the open-ing with placing the intermediate section of cover around the upper transversal part of the frame to accommodate the upper transversal part of the frame in the interspace so as to wrap the upper transversal part, and a placement of each of the two lateral posts respectively in the first internal space of the first closed tubular section and in the second internal space of the second closed tubular section so as to wrap the two lateral posts,
a passage of the cover from the opening position to the closing position for which the frame is wrapped in the cover, closing the reversible closing means equipping the opening, which runs around the central panel along the first closed tubular section of the intermediate section and the second closed tubular section.

* * * * *